United States Patent [19]
Iwatsuki et al.

[11] Patent Number: 4,811,223
[45] Date of Patent: Mar. 7, 1989

[54] SYSTEM FOR CONTROLLING ENGINE TORQUE

[75] Inventors: Kunihiro Iwatsuki; Yoshio Shindo, both of Toyota, Japan

[73] Assignee: Toyota Jidosha Kabushiki Kaisha, Japan

[21] Appl. No.: 870,186

[22] Filed: Jun. 3, 1986

[30] Foreign Application Priority Data

Jun. 4, 1985 [JP] Japan .................................. 60-121067
Jun. 5, 1985 [JP] Japan .................................. 60-121698

[51] Int. Cl.$^4$ ...................... B60K 31/04; B60K 41/08; G05D 17/02
[52] U.S. Cl. .................... 364/424.1; 74/866; 123/435
[58] Field of Search ............... 364/424.1, 442, 431.07; 74/861, 866, 867; 123/352, 435

[56] References Cited

U.S. PATENT DOCUMENTS

| | | | |
|---|---|---|---|
| 3,895,541 | 7/1975 | Nohira et al. | 74/866 |
| 4,109,772 | 8/1978 | Poore | 74/861 |
| 4,208,929 | 6/1980 | Heino et al. | 74/866 |
| 4,262,335 | 4/1981 | Ahlen | 74/866 |
| 4,266,447 | 5/1981 | Heess et al. | 74/866 |
| 4,370,903 | 2/1983 | Stroh et al. | 74/866 |
| 4,403,527 | 9/1983 | Mohl et al. | 74/866 |
| 4,463,427 | 7/1984 | Bonnetain et al. | 74/866 |
| 4,523,281 | 6/1985 | Noda et al. | 364/424.1 |
| 4,543,934 | 10/1985 | Morita et al. | 123/435 |
| 4,556,942 | 12/1985 | Russo et al. | 364/431.07 |
| 4,643,048 | 2/1987 | Hattori et al. | 74/866 |
| 4,671,235 | 6/1987 | Hosaka | 123/352 |

*Primary Examiner*—Felix D. Gruber
*Attorney, Agent, or Firm*—Parkhurst, Oliff & Berridge

[57] ABSTRACT

A system for controlling an engine torque is provided, wherein the engine torque is changed by predetermined values when an automatic transmission is shifting to satisfactorily maintain the shift characteristics of an automatic transmission. An operating area for controlling the engine torque change and/or the predetermined values are corrected in accordance with temperature in an exhaust system of engine, or the frequency of the engine torque change. As a result, rise in temperature in the exhaust system, worsened fuel consumption rate and deteriorated contents of exhaust gas, which are caused due to the frequent torque changes can be avoided.

16 Claims, 10 Drawing Sheets

FIG.3

| SHIFT POSITION | | Co | C1 | C2 | Bo | B1 | B2 | B3 | Fo | F1 | F2 |
|---|---|---|---|---|---|---|---|---|---|---|---|
| P | | ○ | | | | | | | | | |
| R | | ○ | | ○ | | | | ○ | | | |
| N | | ○ | | | | | | | | | |
| D | 1ST | ○ | ○ | | | | | | △ | | △ |
| D | 2ND | ○ | ○ | | | | ○ | | △ | △ | |
| D | 3RD | ○ | ○ | ○ | | | ○ | | △ | | |
| D | O/D | | ○ | ○ | ○ | | ○ | | | | |
| 2 | 1ST | ○ | ○ | | | | | | △ | | △ |
| 2 | 2ND | ○ | ○ | | | ○ | ○ | | △ | △ | |
| 2 | 3RD | ○ | ○ | ○ | | | ○ | | △ | | |
| L | 1ST | ○ | ○ | | | | | ○ | △ | | △ |
| L | 2ND | ○ | ○ | | | ○ | ○ | | △ | △ | |

○ --- OPERATING
△ --- OPERATING ONLY DURING DRIVING

| SHIFTING | | θ | C = 0 | C = 1 |
|---|---|---|---|---|
| DOWN SHIFT | TO 2nd | θ1-4 | 0°CA | 0°CA |
| | | θ5 | 25°CA | 0°CA |
| | | θ6 | 25°CA | 0°CA |
| | | θ7 | 25°CA | 0°CA |
| | TO 1st | θ1-4 | 0°CA | 0°CA |
| | | θ5 | 25°CA | 25°CA |
| | | θ6 | 25°CA | 25°CA |
| | | θ7 | 25°CA | 25°CA |

Δ°CA

PROHIBITING DOWN SHIFT CONTROL TO 2ND GEAR

CHANGE VALVE OF IGNITION TIMING DURING SHIFTINING (T' < T)

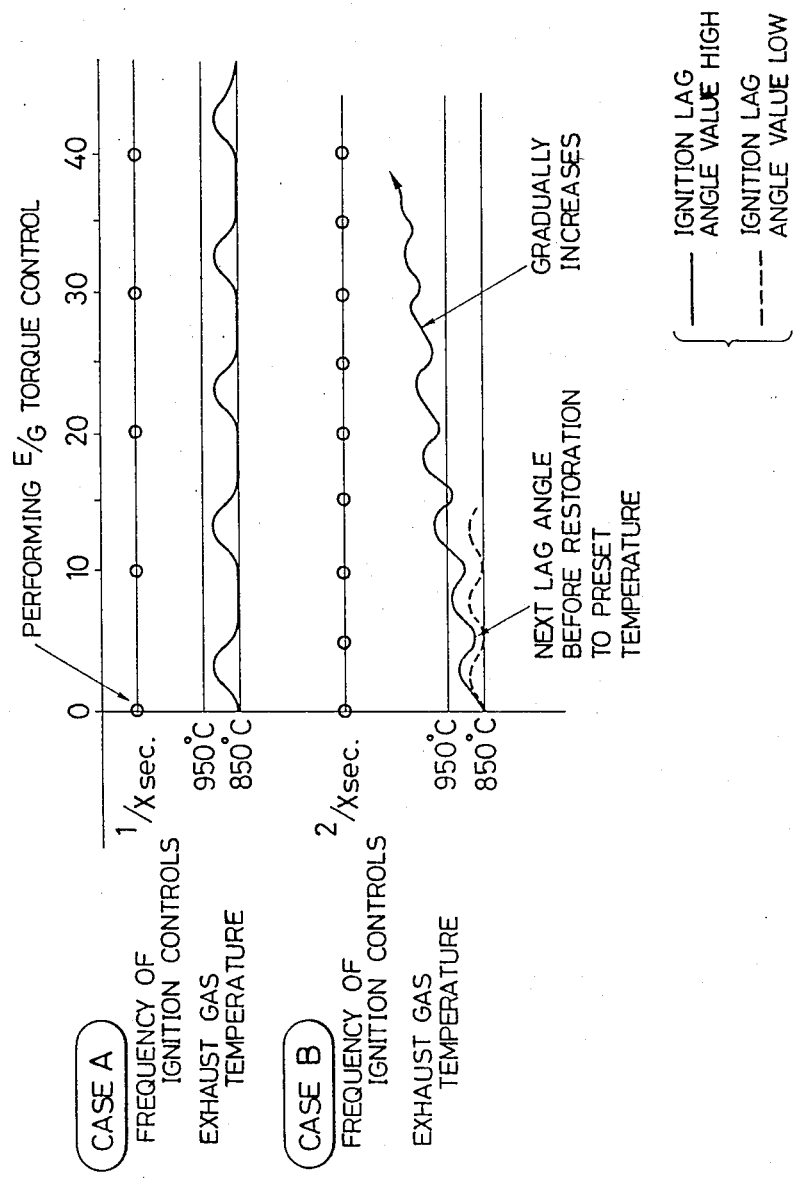

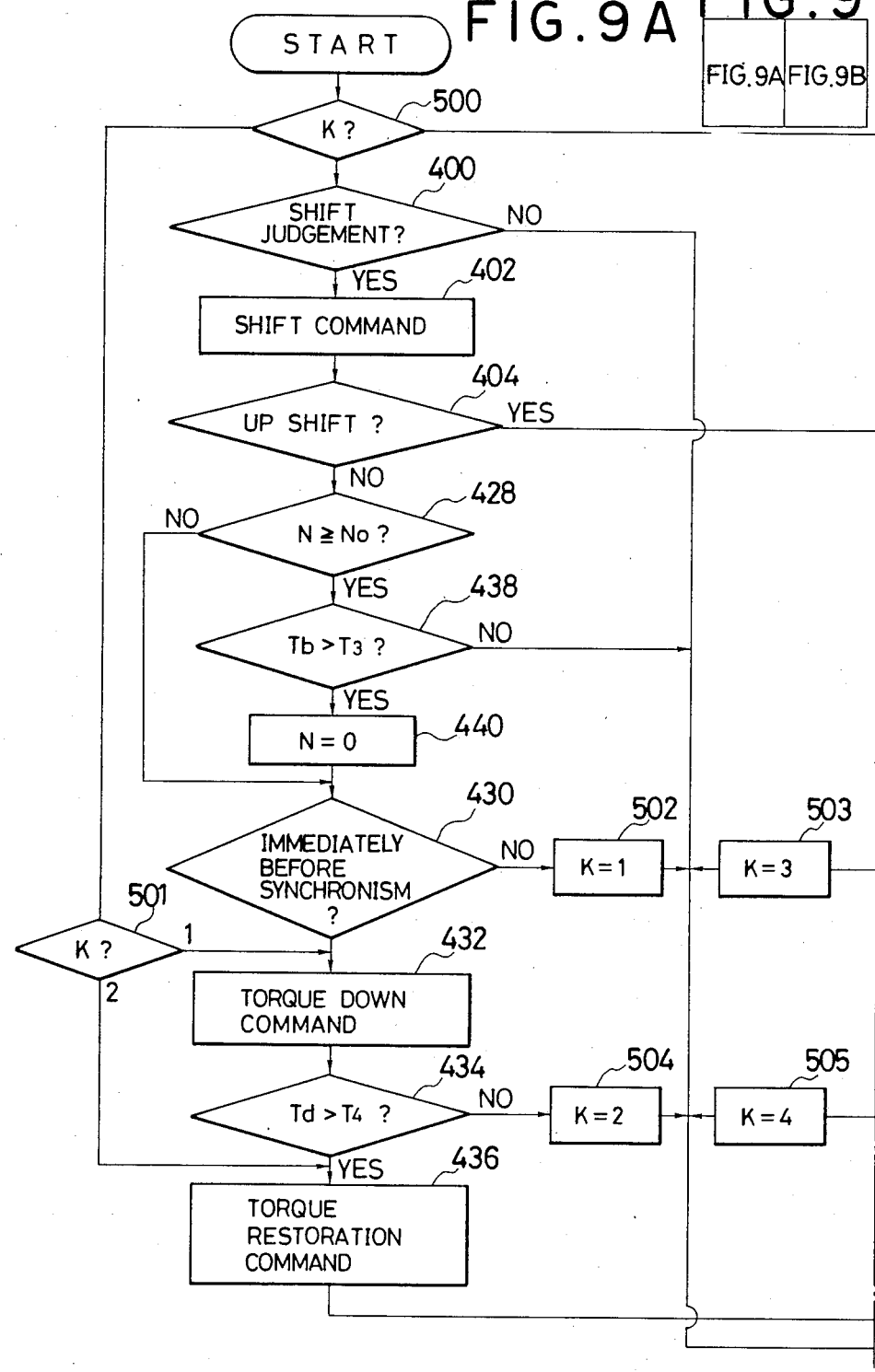

SYSTEM FOR CONTROLLING ENGINE TORQUE

BACKGROUND OF THE INVENTION

This invention relates to a system for controlling an engine torque, and more particularly to improvements in a device for controlling an engine torque, wherein an engine torque is changed by predetermined values during shifting to satisfactorily maintain the shift characteristics of an automatic transmission.

There is known an automatic transmission for a vehicle, constructed such that a gear mechanism and a plurality of frictionally engaging devices are provided, and a hydraulic control system is operated to selectively change the engagement of the frictionally engaging devices, to thereby achieve any one of a plurality of gear stages.

There have been also proposed many methods of integrally controlling the automatic transmission and the engine, wherein, an engine torque is changed during shifting (e.g. Japanese Patent application Laid-Open (Kokai) No. 67738/1980). When a torque transmitted quantity from the engine is changed during shifting, an amount of absorbed energy in members of the automatic transmission or in the frictionally engaging devices for controlling these members caan be decreased, so that the shifting is completed with a small shift shock for a short period of time. As a result, a satisfactory shift feeling can be given to a driver, and the frictionally engaging devices can be improved in durability.

However, when a method of delaying the ignition timing is adopted as means for changing (reducing) the engine torque for example, so-called after-burning is increased due to the delay in the ignition timing, a problem is presented such that the temperature in the exhaust system is raised. On the other hand, sometimes the engine torque is increased depending on the types of shifting, however, in this case, for example, when a method of increasing a fuel supply quantity or an intake air quantity is adopted as a method of changing (increasing) the engine torque, the temperature in the exhaust system is also raised in general.

The rise in the temperature in the exhaust system, which is caused due to the engine torque control during shifting, presents no problem if the shift frequency is normal. However, when the engine is running in a mountainous district where the shift frequency is high, or on-off accelerator operations are intentionally performed by a user for example, the temperature in the exhaust system is raised to more than a tolerance value, and in an extreme case, there is the possiblity of causing cracks in an exhaust manifold, deterioration of a catalyst, damages to a turbine blade of turbocharger, and the like.

Furthermore, when the changes in the engine torque are performed with a very high frequency, particularly, when torque decreasing control is performed, a method of suppressing the original combustion of the engine, such as an ignition timing retard, is carried out. Under these circumstances, the fuel consumption rate is worsened, the content of exhaust gas are increased to more than a specified value and so on.

As a consequence, in designing an engine torque control routine, in setting a map of engine torque change values and so on, it is necessary that no problems occur as a result of the temperature in the exhaust system, fuel consumption rate, and exhaust gas contents, even when shifting would be performed with the anticipated highest frequency.

However, when the torque change values in the map for engine torque control are set at slightly low values obviate the above-identified disadvantages, the original purpose of control for improving the shift characteristics (including the durability of frictionally engaging devices) may not be satisfactorily achieved.

SUMMARY OF THE INVENTION

The present invention was developed to obviate the above-described disadvantages of the prior art and has as its object the provision of an engine torque control system, wherein, in controlling an engine torque during shifting, the original function of the engine control can be satisfactorily displayed without causing such disadvantages as rise in the temperature in the exhaust system, worsened fuel consumption rate, and increased contents of exhaust gas and so forth.

As the technical gist is shown in FIG. 1(A), to achieve the above-described object, a first embodiment of the invention contemplates that, in a system for controlling an engine torque, wherein the engine torque is changed by predetermined values during shifting to satisfactorily maintain the shift characteristics of an automatic transmission, the system comprises:

means for determining the operating area of the engine torque change;

means for detecting the temperature in an exhaust system of the engine; and means for correcting at least one of the group consisting of the operating area of the engine torque change and the predetermined values, when the temperature in the exhaust system of the engine is higher than a reference value.

As the technical gist is shown in FIG. 1(B), a second embodiment of the invention contemplates that, in a system for controlling an engine torque, wherein the engine torque is changed by predetermined values during shifting to satisfactorily maintain the shift characteristics of an automatic transmission, the system comprises:

means for determining the operating area of the engine torque change;

means for detecting the frequency of the engine torque changes; and means for correcting at least one of the group consisting of the operating area of the engine torque change and the predetermined values, when the frequency of the changes exceeds a reference value.

A specific embodiment of the present invention is that correction of the operating area is performed in accordance with an engine load, a type of shift and/or a vehicle speed to precisely prevent the temperature in the exhaust system from rising, while the deterioration of the engine characteristics is suppressed to the minimum.

Another specific embodiment of the present invention is that two reference values are provided and hysteresis is provided when the correction is started and when the correction is released respectively, whereby, after the rise of the temperature in the exhaust system is somewhat settled, the normal torque change control is performed. Namely, in this specific form, the temperature in the exhaust system is prevented from being held at a high temperature for a long period of time.

In the first embodiment, the temperature in the exhaust system detected, and, when the temperature in the exhaust system exceeds a reference value, the operating area of the engine torque change, (which should be originally performed during shifting) and/or the torque change value are corrected. As a result, in designing routines of the engine torque control, in setting the torque change values and so on, there is no need to consider any restriction for avoiding the disadvantage due to the rise of temperature in the exhaust system, so that the freedom of designing engine torque control is high, and, the original object of satisfactory shift characteristics is further achieved.

In the second embodiment, the frequency of the torque changes detected, and, when the frequency of the torque changes exceeds a reference value, the operating area of the engine torque change, (which should be originally performed during shifting,) and/or the torque change value are corrected. As a result similar to that of the first embodiment, in designing a routine of the engine torque control, in setting the torque change values and so on, there is no need to consider any restriction for avoiding the disadvantage due to the rise of temperature in the exhaust system, so that the freedom of designing engine torque control is high, and, the original object is further achieved. Moreover, worsened fuel consumption rate and increased contents of the exhaust gas due to the frequent engine torque changes can be avoided.

Additionally, in this specification and claims, "the temperature in the exhaust system" refers to the temperature of the exhaust gas, the temperature of the exhaust manifold, the temperature of the catalyst for purifying the exhaust gas and the like, for example.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is a chart showing the actuated state of the frictionally engaging devices at the respective gear stage of the automatic transmission mentioned above;

FIG. 8 is a chart schematically explaining the effects in the above embodiment in view of the conventional disadvantages;

FIGS. 9A and 9B taken together illustrate a flow chart showing the routine of the engine torque changes in the second embodiment, corresponding to FIG. 5.

DETAILED DESCRIPTION OF THE PREFERRED EMBODIMENTS

The embodiments of the present invention well be described in detail with reference to the accompanying drawings.

Figure 1A:
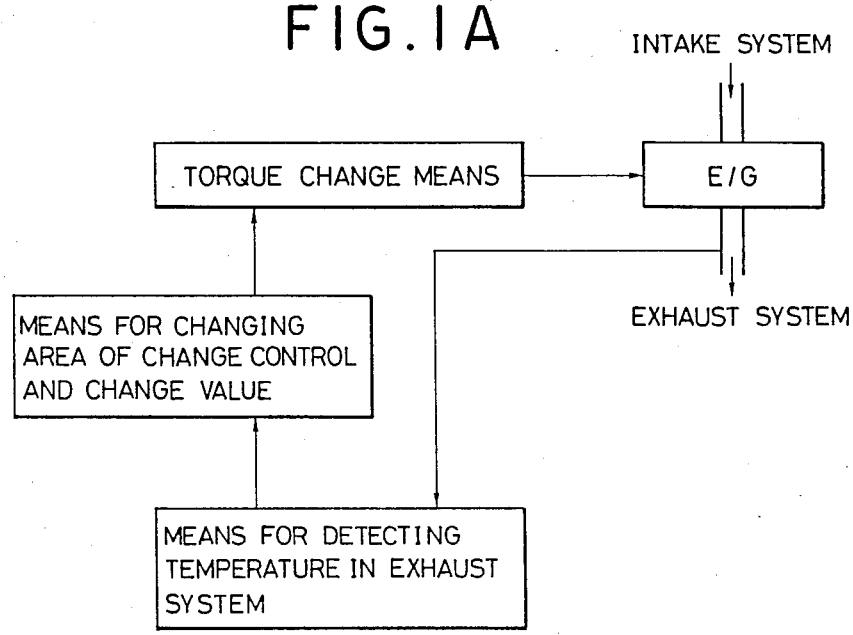
FIGS. 1A and 1B taken together illustrate a flow chart showing the technical gist of the engine torque control system according to the present invention.
Figure 1B:
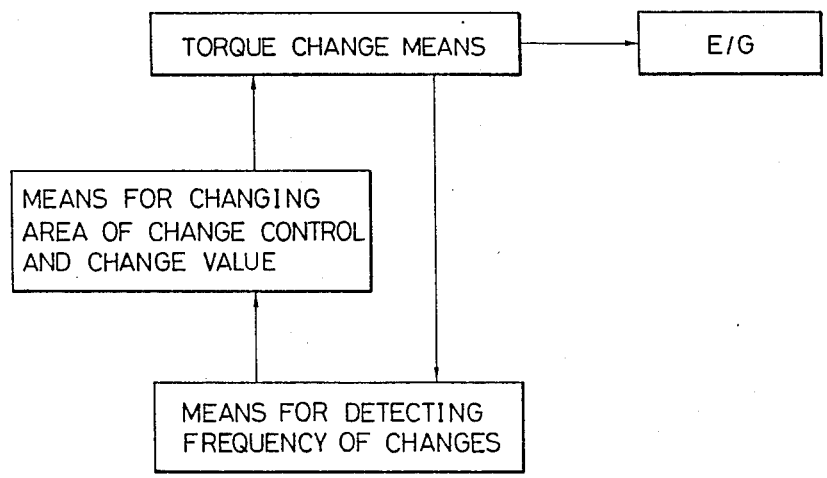
Figure 2:
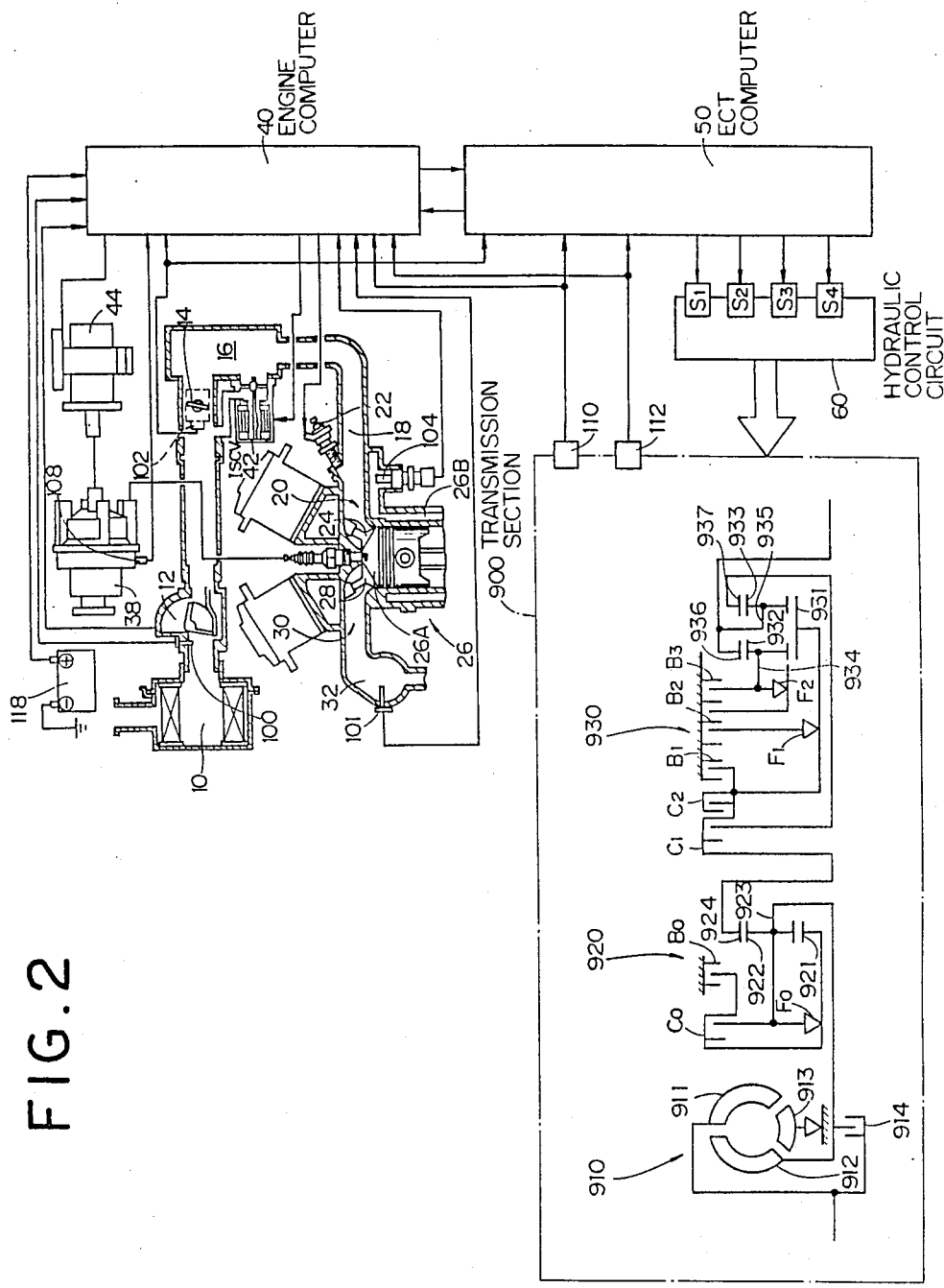
FIG. 2 is a sectional view, partly including a block diagram showing the automatic transmisson combined with an intake-air quantity sensing type electronic fuel injection engine, in the first embodiment of the present invention.

FIG. 2 is the general arrangement drawing showing the automatic transmission combined with the intake-air quantity sensing type electronic fuel injection engine (hereinafter referred to as an "ECT"), to which is applied the embodiment of present invention.

Air taken into an air cleaner 10 is successively delivered to an air flow meter 12, an intake throttle valve 14, a surge tank 16 and an intake manifold 18. This air is mixed with fuel injected from an injector 22 in the proximity of an intake port, and further, delivered to a combustion chamber 26A of a main body 26 of the engine through an intake valve 24. The exhaust gas produced due to the combustion of an air-fuel mixture in the combustion chamber 26A is exhausted to atmosphere through an exhaust valve 28, an exhaust port 30, an exhaust manifold 32 and an exhaust pipe (not shown).

An intake-air temperature sensor 100 is provided in the air flow mater 12 for detecting intake air temperature. An exhaust gas temperature sensor 101 is provided in the exhaust manifold 32 for detecting exhaust gas temperature of the engine. The intake throttle valve 14 rotates in operational association with an accelerator pedal (not shown), which is provided at a driver's seat. A throttle sensor 102 is provided in this intake throttle valve 14 for detecting a throttle opening degree thereof. A water temperature sensor 104 is provided in a cylinder block 26B of the main body 26 of the engine for detecting an engine cooling water temperature. A crank angle sensor 108 is provided in a distributor 38 which has a shaft rotatable by a crankshaft of the main body 26 of the engine, for detecting a crank angle from the rotation of the shaft.

A vehicle speed sensor 110 for detecting the vehicle speed from the rotation speed of an output shaft thereof, and a shift position sensor 112 for detecting a shift position are provided in the ECT. Outputs from these sensors 100, 101, 102, 104, 108, 110 and 112 are inputted to an engine computer 40. The engine computer 40 calculates a fuel injection flowrate and the optimum ignition timing by using the input signals from the sensors as parameters, and controls the injection 22 so that a fuel commensurate to said fuel injection flowrate can be injected, and controls the ignition coil 44 so that the optimum ignition timing can be obtained.

An idle rotation speed control valve 42 driven by a step motor is provided in a bypass passage intercommunicating the upstream side of the throttle valve 14 with the surge tank 16, whereby an idle rotation speed is controlled in response to a signal from the engine computer 40.

On the other hand, a transmission section 900 of the ECT in this embodiment includes a torque converter 910, an overdrive mechanism 920 and an underdrive mechanism 930.

The torque converter 910 includes a well-known pump 911, a turbine 912, a stator 913 and a lockup clutch 914.

The overdrive mechanism includes a set of planetary gears consisting of a sun gear 921, a planetary pinion 922 being in mesh with the sun gear 921, a carrier 923 supporting the planetary pinion 922 and a ring gear 924 being in mesh with the planetary pinion 922. The rotating conditions of this planetary gear is controlled by a clutch Co, a brake Bo and a one-way clutch Fo.

The underdrive mechanism 930 includes two sets of planetary gears consisting of a common sun gear 931, planetary pinions 932 and 933, which are in mesh with the sun gear 931 respectively, carriers 934 and 935, which support the planetary pinions 932 and 933 respectively, and ring gears 936 and 937, which are in mesh with the planetary pinions 932 and 933 respectively. The rotating conditions of these two sets of planetary gears are controlled by clutches C1 and C2, brakes B1-B3 and one-way clutches F1 and F2. Since the connected state of the respective component parts of this transmission 900 is well known, only the skeleton diagram is shown in FIG. 2 and detailed description will be omitted.

Figure 4:
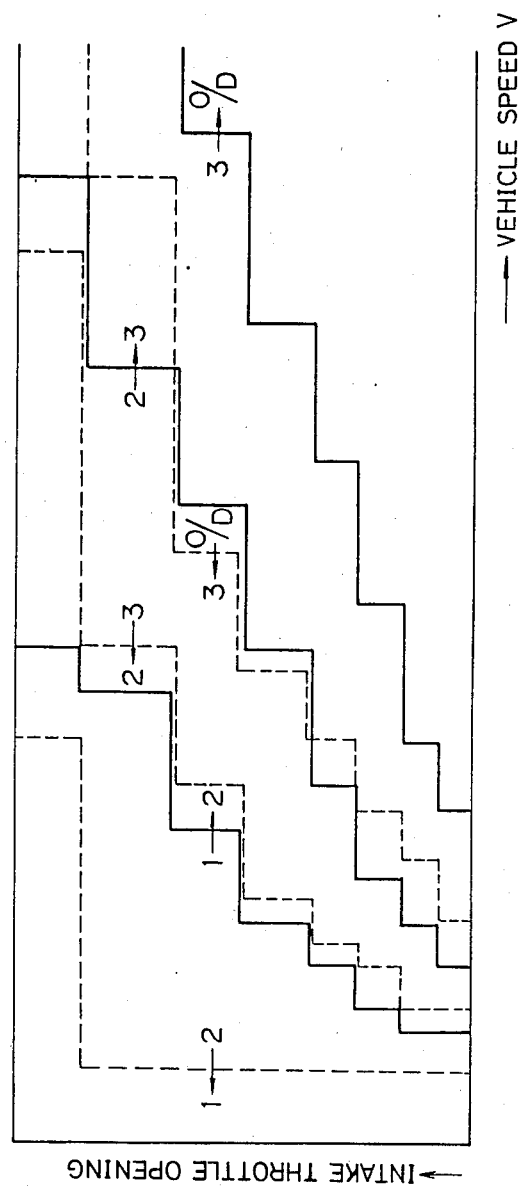
FIG. 4 is a chart showing the shift points in the respective gear stages.

In this embodiment, electromagnetic valves S1-S4 in a hydraulic control circuit 60 are driven and controlled in accordance with a preset shift patern by an ECT computer 50 inputted thereto with signals from the throttle sensor 102, the vehicle speed sensor 110 and so forth. As a result, various combinations of the clutches, brakes and the like are made as shown in FIG. 3, so that the shift control as shown in FIG. 4 can be performed.

Additionally, marks ⊡ in FIG. 3 indicate the operated positions and marks Δ indicate the operated positions only when the engine is power on. Furthermore, the electromagnetic valves S1 and S2 control the underdrive mechanism 930, the electromagnetic valve S3 controls the overdrive mechanism 920, and the electromagnetic valve S4 controls the lockup clutch 914, respectively.

In the system of the type described, the engine computer 40, receiving shift informaton (shift judgment, a shift command, lockup clutch engagement permission and the like) from the ECT computer 50, performs the engine torque control in association with a signal from the exhaust gas temperature sensor 101.

Additionally, in this embodiment, the engine computer 40 and the ECT computer 50 are formed separately of each other, however, according to the present invention, the number of the control components and the control sharing areas need not necessary be limited.

Figure 5:
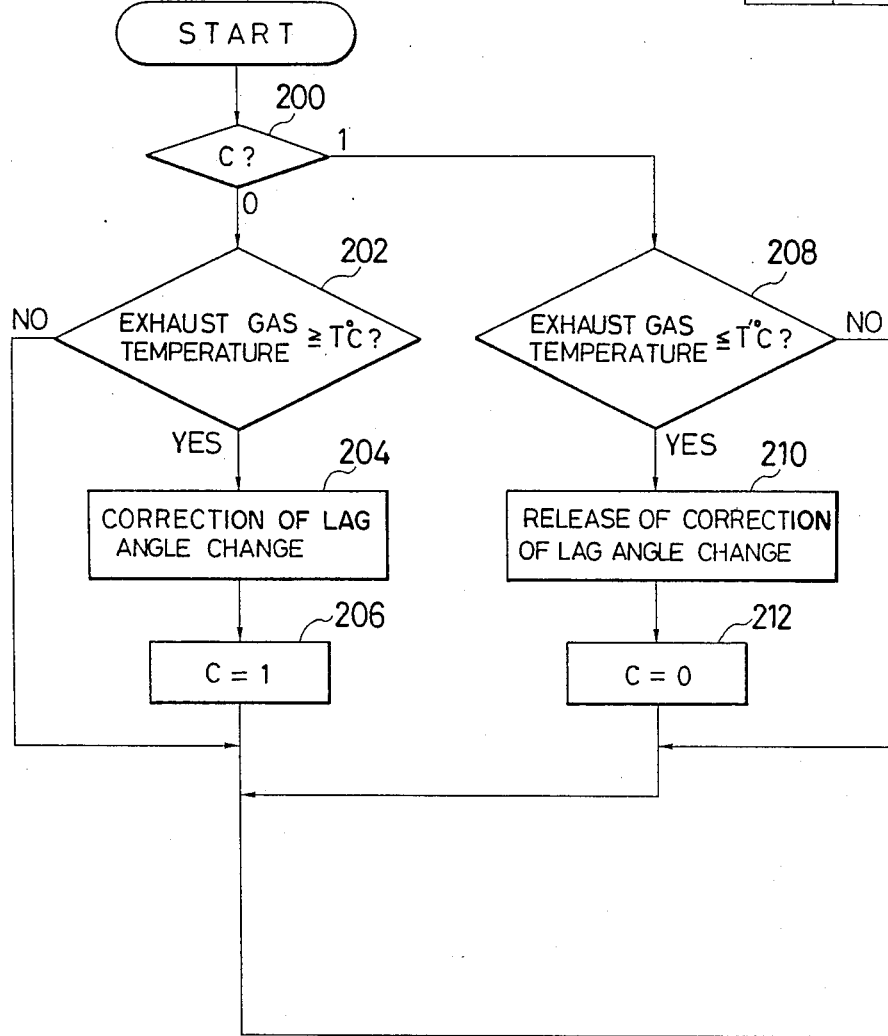
FIGS. 5A and 5B taken together illustrate a flow chart showing the routine of the engine torque control.

The engine torque control of the vehicle in this embodiment is performed in accordance with the flow chart shown in FIG. 5.

First, in Step 200, judgment is made as to whether a flag C is 1 or 0. This flag C is one showing whether the torque change value is being corrected or not. Here, when the correction is under way, the level 1 is selected, whereas, when the correction is not under way, the level 0 is selected.

When equals to 0, i.e. the correction is not under way, the routine proceeds to Step 202, where judgement is made as to whether the exhaust gas temperature detected by the exhaust gas temperature sensor 101 is at a reference value T° C or more. When the exhaust gas temperature equals to or exceeds the reference value T° C, the routine proceeds to Step 204, where a lag angle change value is corrected, and, in Step 206, the flag C is set at 1 to show that the correction of the lag angle change value is under way.

On the other hand, C equals to 1, i.e. the correction of the lag angle change value is under way, the routine proceeds to Step 208, where judgment is made as to whether the exhaust gas temperature is at a reference value T'° C (provided that T° C > T'° C) or therebelow. When the exhaust gas temperature is at T'° C or more, the correction of the lag angle change value is continued. When the exhaust gas temperature is at T'° C or below, the routine proceeds to Step 210, where the correction of the lag angle change value is released, i.e. the normal operating area of the engine torque change and the normal setting of the lag angle change value are restored. In Step 212, the flag C is reset to 0.

The following situations are conceivable from the correction of the operating area and the correction of the lag angle change value:

(1) A specific shifting is prohibited.

For example, no engine torque change is performed at the time of down shifting to 2nd gear stage (Refer to thick solid lines in FIG. 6) for example, which can be realized by correcting all the change constants to 0. More specifically, the shift point in the automatic transmission rises on the right side in a shift chart in general. In the same vehicle speed, a down point is set at the higher throttle opening, having a predetermined hysteresis, relative to an up point (Refer to FIG. 4). In consequence, in an automatic shift vehicle, the cases that shiftings are repeated in a short time are generally limited to the cases where the vehicle runs in mountainous district, and wherre up shiftings when an accelerator is released and down shiftings when the accelerator is depressed are intentionally repeated by a driver. Since the operating area of the engine torque change are limited to the case where the throttle opening is relatively high in general, a shifting with changing an ignition timing is the above-described down shifting when the accelerator is depressed. Now, the the down shifting performed by the depression of the accelerator, even if the engine torque change is not performed, although the shift shock is increased, no problem is presented about the durability of the automatic transmission. In consequence, when omission of the engine torque change is limited to the specific down shifting, merely the shift shock somewhat increases, however, no troubles occur. Rather, the increase in the shift shock offers such an indirect effect that the driver is caused to refrain from frequent on-off operation of the accelerator.

(2) Part of a specific shifting is prohibited.

For example, in the case of down shifting to 2nd gear stage or 1st gear stage, performing of the engine torque control is limited to the case where the throttle opening is larger. More specifically, when the throttle opening is small, demand for the engine torque change is low when considering shift shock and durability of the automatic transmission. In consequence, for example, the case where the engine torque change is limited to the wide open throttle, fits this.

(3) The torque change value is made low.

In the case where the angle of lag of the ignition timing is used as means of the torque change, for example, a method of decreasing the lag angle value from 25° CA to 15° CA fits this.

Description will now return to the flow chart FIG. 5. After the selection change of the lag angle value (C=0, C=1) of the engine torque change to the exhaust gas temperature is determined as described above, the engine torque change is performed only when the automatic transmission is shifted.

When the shift judgment is made in Step 214, the routine proceeds to Step 216, where a shift command is outputted. In Step 218, the time of starting of the engine torque change is determinated by whether the automatic transmission has entered an inertia phase or not. Here, the inertia phase refers to a time duration, during which a rotatable member of the automatic transmisson performs a rotation speed change for shifting. The time of starting of the inertia phase can be known from the detection of the rotation speed of the predetermined rotatable member, detection of the engine speed or a time from output of the shift command, etc.

When it is judged that the inertia phase is started in Step 218, in Step 220, a lag angle value of the ignition timing is specifically determined in accordance with the type of shifting and the throttle opening (engine load) within the afore-selected selection range and the exhaust gas temperature, and, in Step 222, the lag angle of the ignition timing is carried out.

Thereafter, in Step 224, the end of the inertia phase is detected, and, in Step 226, the ignition timing is restored.

Additionally, Steps 300–308 are the Steps relating to the setting of a Flag F for substantially stopping the flow until the inertia phase is started or stopped, and so on.

In this embodiment, the change value of the ignition timing (a predetermined value in the engine torque change) is set in accordance with high or low exhaust gas temperature, on the basis of the throttle opening and types of shift, so that, even if the exhaust gas temperature rises, the rise is suppressed.

Figures 6, 7:
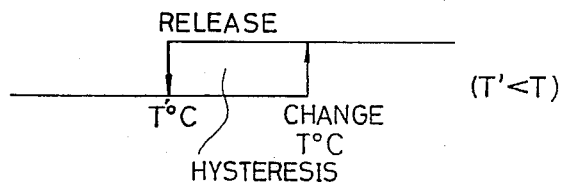
FIG. 6 is a chart showing an example of the map when the change values of an ignition timing is determined.
FIG. 7 is a chart showing the relationship between the two reference values.

As shown in FIG. 7, the hysteresis is provided at the start and the release of the correction T° C and T° C in Steps 202 and 208, so that the exhaust gas temperature will not be held in the proximity of T° C, i.e. the high temperature for a long period of time.

The effects obtained by this embodiment will be described in detail with reference to the schematic view shown in FIG. 8.

In the normal operating conditions, as shown in a case A, even if the exhaust gas temperature rises by the control of the ignition control as indicated by a solid line in the drawing for example, the frequency is low (once in X sec for example), so that the exhaust gas temperature can be restored to a predetermined value, e.g. 850° C., thus presenting no problem.

However, as shown in a case B, when the shiftings are frequently performed, e.g. two torque controls are carried out during X sec, the succeeding rise in the exhaust gas temperature occurs before the exahust gas temperature is restored to the predetermined value (850° C.), the exhaust gas temperature gradually rises, and finally, reaches 950° C. (tolerance value) or more.

From this reason, heretofore, the maximum change value of the torque control was set to a slightly low value as indicated by a broken line in the drawing so that the above-described gradual increase would not occur. As a result, it was necessary to set the maximum change value of the torque control so as to be restored to the predetermined value even when the frequency of the engine torque control was high, thus the freedom of design was lowered in relation to the torque control accordingly.

In this embodiment, the exhaust gas temperature is detected, and, when the exhaust gas temperature is higher than the reference value T° C (This reference value T° C is set at a value slightly lower than a tolerance value (950° C. in the example of FIG. 8).) the operating area relating to the engine torque change and the torque change value are corrected, whereby the torque control causing the rise in the exhaust gas temperature is suppressed only when there is a problem, so that, normally, high freedom on flexibility of design can be obtained so as to achieve the originaal purpose of the engine torque change.

The second embodiment will hereunder be described in delail.

Figure 9B:
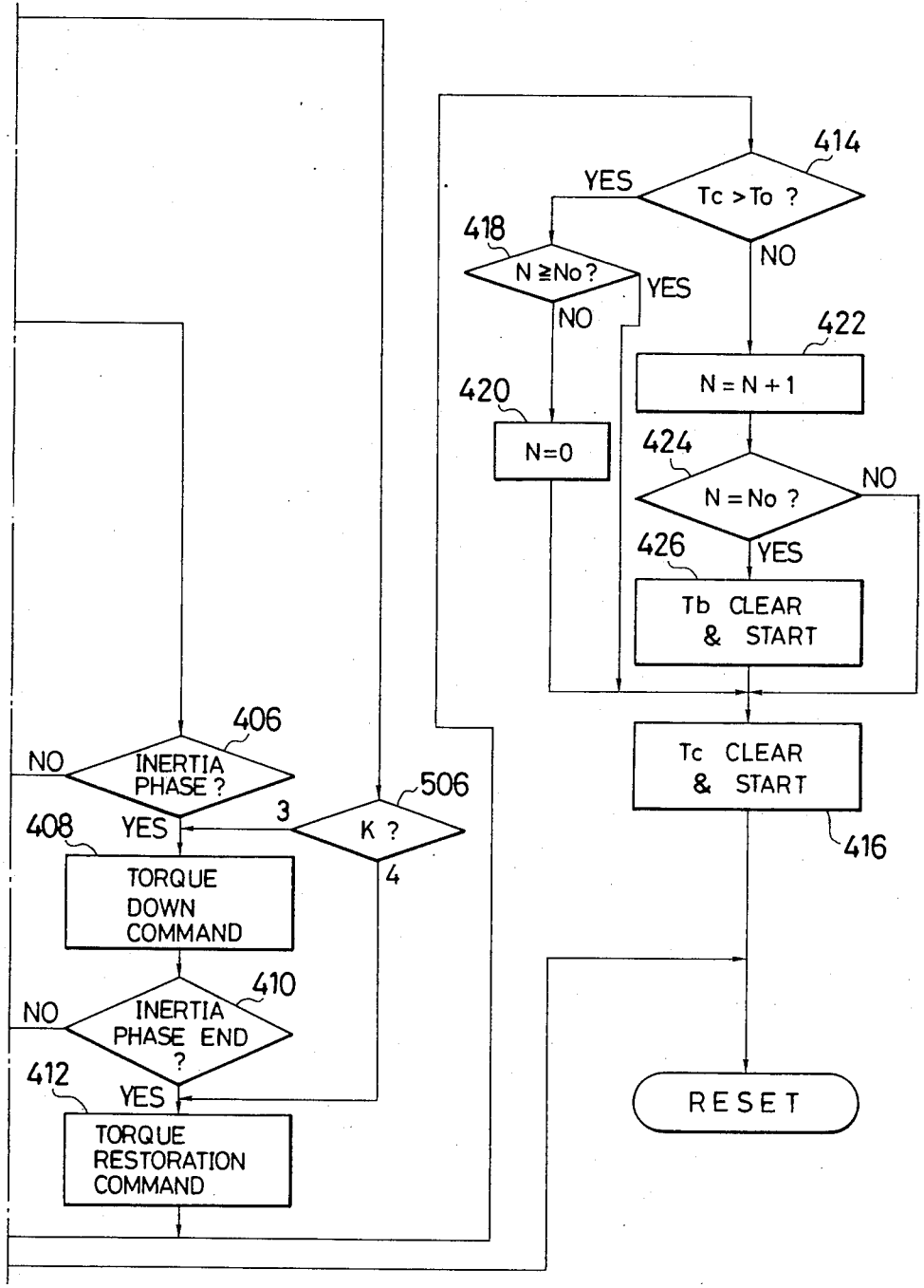

The engine torque control of the vehicle in the second embodiment is performed in accordance with the flow chart as shown in FIG. 9.

First, when a shift judgment is made in Step 400, a shift command is outputted in Step 402. Thereafter, in Step 404, judgment is made as to whether the shifting is the up shifting or not. When the result of judgment is affirmative, the routine proceeds to Step 406, and the torque down control is performed during shifting.

In Step 406, the starting timing of the engine torque change is judged on the basis of whether the transmission has entered the inertia phase or not.

When judgment is made that the inertia phase is started in Step 406, a torque down command is outputted in Step 408. After awaiting the detection of the end of the inertia phase in Step 410, a torque return command is outputted in Step 412.

After the torque return command is outputted in Step 412, the routine proceeds to Step 414, where the time measured by a timer Tc (sec) and a reference value To (sec) are compared with each other. Here, in Step 416, the timer Tc is clear & started after the change of the engine torque, which corresponds to the period of time from the completion of the previous torque change to the completion of the present torque change.

When the time measured by timer Tc is larger in value than the reference To and when it is judged $N<No$ in Step 418, N is made equal to 0 in Step 420, and the routine proceeds to Step 416. Here, N refers to an index value indicating the fact that how many times the succeeding torque changes are made within To sec i.e. the frequency of the torque changes.

On the other hand, when the time measured by timer Tc is judged to be To or therebelow, N is set equal to $N+1$ in Step 422, and the value of the index value N is examined in Step 424. In Step 424, judgement is made as to whether the index value N is equal to the reference value No or not. When the result of judgement is affirmative, a down shift prohibiting timer Tb is clear & started in Step 426. When the result of judgment is negative, Step 426 is bypassed, and the routine directly proceeds to Step 416.

When it is judged that the shift is not an up shifting, the routine proceeds to Step 428, where judgement is made as to whether the index value No is larger than the reference value No or not. When the result of judgment is negative, the torque control for down shifting is performed in Step 430 and so forth. In Step 430, judgment is made as to whether it is immediately before the engine speed turns to be a synchronous rotation speed obtained in accordance with a gear ratio and an output shaft rotation speed or not. In Step 432, a torque down command is outputted at a stage where it is immediately before the synchronism. In Step 434, a torque return command is outputted when a time measured by a timer Td from the torque down command is larger than a predetermined value T4 (in Step 434).

On the other hand, it is judged that the index value N equals to or exceeds the reference value No in Step 428, the down shift prohibiting timer Tb is examined in Step 438. When the time measured by timer Tb is larger than a reference value T3, in Step 440, the index value N is cleared, and similarly to the above, the torque control is carried out in Steps 430–436. Whereas, the time measured by timer Tb is equal to or less than T3, the index value N is reset.

Additionally, Steps 500–506 refer to the Steps relating to the setting of a flag K for substantially stopping the flow until the conditions in Steps 406, 410, 430 and 434 are established, and so on.

To summarize the foregoing in connection with the practical shift, this control prohibits the torque control of the down shifting only during T3 sec, when the succeeding torque changes are repeated No times within To sec from a torque change. In this case, after the aforesaid down shiftings are repeated No times, when an up shifting occurs, the routine proceeds to Step 414 and so forth after the torque control is carried out. When the time measured by the timer Tc (a time duration from a change to another change) is longer than the reference value To, in Step 418, judgement is made that N equals to or becomes larger than No, and only the timer Tc is cleared and started in Step 416. When the time measured by the timer Tc is shorter than the reference value To, judgement is made that N is larger than No in Step 418, and the routine proceeds to Step 416. Because of this, even in this case, only the timer Tc is cleared and started, and, no influence is rendered to the index value N and the down shift prohibiting timer Tb. On the other hand, when the index value N is less than the reference value No, if the time measured by the timer Tc becomes longer than the reference value To, then the index value N is cleared. Furthermore, when the index value N equals or exceeds No, a down shifting is carried out, and, when the time measured by the down shift prohibiting timer Tb becomes longer than the reference value T3, the index value N is cleared. Further, this down shift prohibiting timer Tb is cleared & started only when the index value N becomes equal to the reference value No.

For the above-described reasons, the torque control is prohibited only in the down shifting in the above embodiment.

Figure 10:
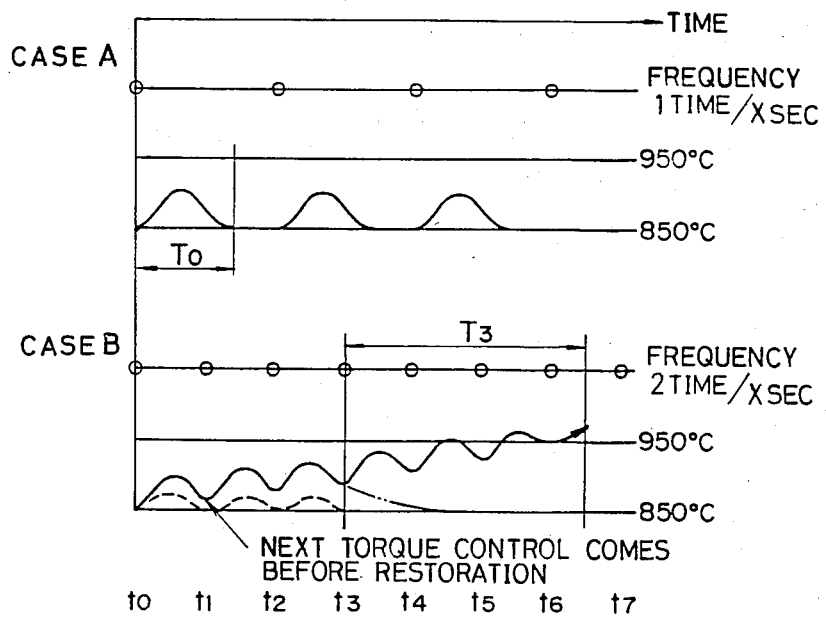
FIG. 10 is a chart schematically explaining the effects in the second embodiment in view of the conventional disadvantages, corresponding to FIG. 8.

The effects obtained by this second embodiment will be described with reference to the schematic view shown in FIG. 10.

During the normal operating conditions, for example, even when the exhaust gas temperature of the engine rises due to the control of the ignition timing as indicated by a solid line in the case A, the exhaust gas temperature can be readily restored to the predetermined value, e.g. 850° C. because the frequency is low (e.g. once for X sec), thus presenting no particular problem. Furthermore, there is no particular problem from the viewpoints of the fuel consumption rate and the contents of the exhaust gas.

However, as shown in the case B, when the shiftings are frequently performed (two torque controls are carried out for X sec for example), the succeeding rise of the exhaust gas temperature occurs before the exhaust gas temperature restored to the predetermined value (850° C.). As a result, the exhaust gas temperature rises gradually, and finally exceeds the tolerance value 950° C. Furthermore, problems occur from the viewpoints of the fuel consumption rate and the contents of the exhaust gas.

From this reason, heretofore, the maximum change value has been set to slightly lower value as indicated by the broken line in the drawing so that the above-described problem would not occur, and, it has been necessary to set the maximum value of the torque control so as to avoid the problem even when the frequency of the engine torque control was high. In consequence, the freedom of design in relation to the torque control has been lowered accordingly.

In this embodiment, the frequency N of the engine torque controls is detected, and, when the frequency N is equals to or exceeds the reference value No, the engine torque change relating to the down shifting at the time of t3 in the drawing is suppressed during T3 sec, so that the above-described disadvantages can be avoided (Refer to a two-dot chain line). In consequence, only when there is a possibility of practically raising a problem, the torque change can be suppressed, normally, design of the high freedom can be made so as to be able to achieve the original purpose of the engine torque change.

In general, where the temperature in the exhaust system rises due to the engine torque change, there is conceivable the case where the ignition timing is retarded to decrease the engine torque, the case where the fuel injection quantity is increased to increase the engine torque, and so forth. According to the present invention, since the case where the exhaust gas temperature has been practically raised due to the engine torque change, or the case where the exhaust gas temperature is to be raised due to the engine torque change is taken up as the problem, means for performing the engine torque change and the like are not limited in particular. However, needless to say that, for example, in correcting the operating area, the qualitative influence rendered to the temperature in the exhaust system by tese means and the like should be considered.

Furthermore, in the above-described embodiments, there have been shown one wherein the corrections of the operating area and the change value are performed in accordance with the throttle opening (engine load) and the type of the shifting, however, the present invention need not necessarily be limited to this, and such an arrangement may be adopted that, for example, the corrections are performed in accordance with the vehicle speed in addition to the above or replacing the above. In this case, it is desirable to perform the corrections such that the torque change is performed only when the vehicle speed is high.

Additionally, in the above-described embodiment, the two reference values relating to the exhaust gas temperature have been provided and the hysteresis has been provided when the corrections are started and released, respectively, however, according to the present invention, the hysteresis need not necessarily provided.

Obviously, numerous modifications and variations of the present invention are possible in light of the above teachings. It is therefore to be understood that within the scope of the appended claims, the invention may be practised otherwise than as specifically described herein.

What is claimed is:

1. A system for controlling an engine torque, wherein said engine torque is changed by predetermined values when an automatic transmission is shifting to satisfactorily maintain the shift characteristics of said automatic transmission, said system comprising:
   means for detecting a temperature in an exhaust system of said engine; and processor means for controlling the engine torque change, said processor means including means for determining an operation area of the engine torque change, and means for correcting at least one of said operating area of the engine torque change and said predetermined value wherein engine torque change control during shifting is controlled so that a further rise in temperature in the exhaust system is inhibited, when said temperature in the exhaust system of the engine is higher than a reference value.

2. The system as set forth in claim 1, wherein said correction of said operating area is performed in accordance with at least an engine load.

3. The system as set forth in claim 1, wherein said correction of said operating area is performed in accordance with at least a type of shifting.

4. The system as set forth in claim 1, wherein said correction of said operating area is performed in accordance with at least a vehicle speed.

5. The system as set forth in claim 1, wherein two said reference values are provided and hysteresis is provided when said correction is started and released, respectively.

6. The system as set forth in claim 2, wherein two said reference values are provided and hysteresis is provided when said correction is started and released, respectively.

7. The system as set forth in claim 3, wherein two said reference values are provided and hysteresis is provided when said correction is started and released, respectively.

8. The system as set forth in claim 4, wherein two said reference values are provided and hysteresis is provided when said correction is started and released, respectively.

9. A system for controlling an engine torque, wherein said engine torque is changed by predetermined values when an automatic transmission is shifting to satisfactorily maintain the shift characteristics of said automatic transmission, said system comprising:

processor means for controlling the engine torque change, said processor means including means for determining an operating area of said engine torque change;

means for detecting a frequency of said engine torque change; and means for correcting at least one of said operating area of the engine torque change and said predetermined value whereby engine torque change control during shifting is controlled so that a further rise in temperature of an exhaust system for the vehicle is inhibited when said frequency of the engine torque change exceeds a reference value.

10. The system as set forth in claim 9, wherein said correction of the operating area is performed in accordance with at least an engine load.

11. The system as set forth in claim 9, wherein said correction of the operating area is performed in accordance with at least a type of shifting.

12. The system as set forth in claim 9, wherein said correction of the operating area is performed in accordance with at least a vehicle speed.

13. The system as set forth in claim 9, wherein two said reference values are provided and hysterresis is provided when said correction is started and released, respectively.

14. The system as set forth in claim 10, wherein two said reference values are provided and hysteresis is provided when said correction is started and released, respectively.

15. A system as set forth in claim 11, wherein two said reference values are provided and hysteresis is provided when said correction is started and released, respectively.

16. A system as set forth in claim 12, wherein two said reference values are provided and hysteresis is provided when said correction is started and released, respectively.

* * * * *